C. G. VON POST.
BEARING FOR SHAFTS.
APPLICATION FILED FEB. 9, 1920.
1,386,745.  
Patented Aug. 9, 1921.
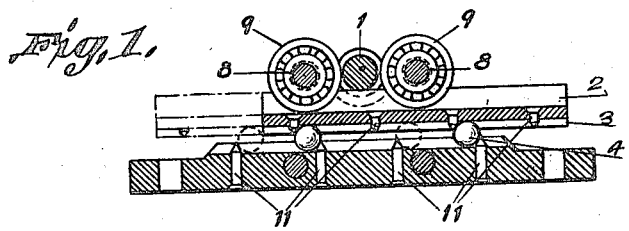
Fig. 1.
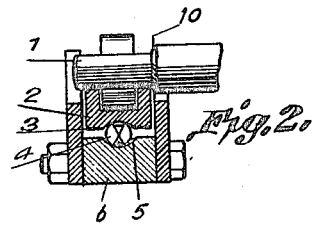
Fig. 2.
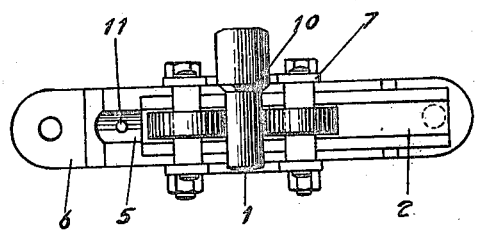
Fig. 3.
Fig. 4.
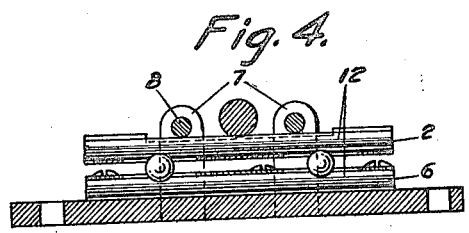
Fig. 5.
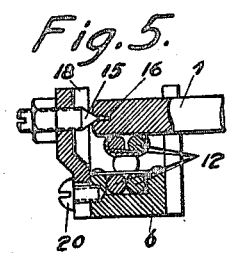
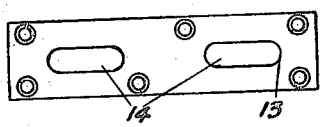
Fig. 7.
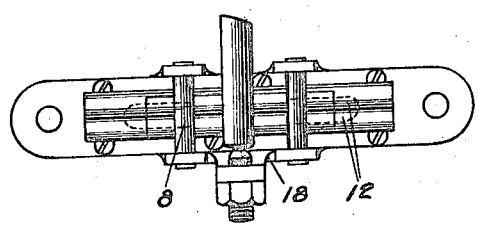
Fig. 6.
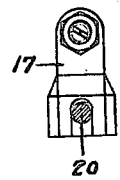
Fig. 8.
Inventor:
Carl Gustaf von Post
per H. W. Plucker
Attorney.

UNITED STATES PATENT OFFICE.

CARL GUSTAF VON POST, OF GOTTENBURG, SWEDEN.

BEARING FOR SHAFTS.

1,386,745.     Specification of Letters Patent.     Patented Aug. 9, 1921.

Application filed February 9, 1920. Serial No. 357,400.

*To all whom it may concern:*

Be it known that I, CARL GUSTAF VON POST, a subject of the King of Sweden, residing at Gottenburg, Sweden, have invented new and useful Bearings for Shafts, (for which I have filed an application in Sweden, on October 12, 1917,) of which the following is a specification.

Hitherto in the mounting of such shafts, in order to reduce friction, it has been necessary to use edge-bearings or point-bearings. Such constructions, however, are unsatisfactory, for the reason that in the case of edge-bearings only a small angular movement is permitted while point-bearings are very fragile and can only be used with very small loads.

The present invention has for its object to provide a bearing in which the frictional losses are greatly diminished and the shaft mounted in the bearing may make a complete revolution (or more than one revolution).

The present invention is characterized by the fact, that the shaft is supported by a carrier which is mounted so as to move in a direction perpendicular or nearly perpendicular to the shaft; and that the shaft is prevented from moving laterally by suitable guiding means. Thus the shaft can perform an oscillating movement up to one or more revolutions and with such a bearing the frictional losses are reduced to a minimum independently of the load on the shaft.

In the accompanying drawing some constructional forms of the invention are illustrated. In the constructional form according to Figures 1–3, Fig. 1 is a vertical section, Fig. 2 a cross-section and Fig. 3 is a plan view. The second constructional form is illustrated in corresponding views Figs. 4–6, while Fig. 7 and Fig. 8 are detail views.

In Figs. 1–3, 1 is a shaft which is supported by a carrier 2. In the underside of this carrier, and perpendicular to the shaft 1, is a groove 3 for guiding two balls 4 upon which the plan 2 is supported. These balls 4 also engage a corresponding groove 5 in a fixed support 6. Above the carrier 2, two pivots 8 are mounted in supports 7, and these pivots serve as shafts for two guiding-rollers 9 for the shaft 1. The shaft 1 is prevented from moving axially by means of a shoulder or flange 10, thereon resting against the edge of the carrier 2. This shoulder or flange 10 is cut obliquely in such manner that it contacts with the carrier only where the shoulder joins the shaft. Sliding friction between the shoulder and the carrier is prevented when the parts are in motion. Arranged at the same distances apart in the carrier 2 and in the support 6 are studs 11 which serve as stops for the balls 4. When the shaft 1 is rotated or rocked it does not change its lateral position, because of the rollers 9, but the carrier 2 is caused to move in relation to the support 6 upon which the carrier is mounted by means of the balls 4. Only a rolling thus takes place and if the bearing be accurately calculated and manufactured the friction is very small and of no importance. By arranging the rollers 9 at a distance from each other somewhat greater than the diameter of the shaft 1, it is also possible that, at the end of its movement (for instance an oscillating movement), the shaft is resting on the carrier 2 quite free from the said rollers.

In the event of the balls 4 changing their position, this is adjusted in the extreme positions of the carrier 2 by means of the studs 11 which return the balls to their original positions.

In the constructional form above described the ball-grooves 3 and 5 are substantially semi-circular in cross-section having a radius somewhat greater than that of the balls. Such a construction, however, is readily affected by dust and the like. By arranging the grooves in such a manner that the balls do not reach to the bottom of the grooves, however, this inconvenience may be removed. Such a construction is shown in Figs. 4–6. Here the grooves are obtained by placing two pairs of rods 12 parallel with each other. The studs 11, above described, are in this case replaced by plates 13 (Fig. 7) with longitudinal openings 14. Thus the carrier 2 in this construction consists of two rods 12 and a plate 13 (Figs. 4 and 5) combined therewith. The rollers 9 also are replaced by a guiding pivot 15, entering an aperture 16 in the shaft 1. This pivot 15 is carried in a supporting bracket 17 which is adjustable in vertical direction by means of guides 18 and can be clamped in any desired position by means of the setscrew 20.

Claims:

1. A bearing for shafts comprising a movable carrier with a straight upper surface for engagement with the shaft and a lower surface having a longitudinal groove therein, a fixed support having in its upper surface a groove parallel to the first groove, spherical bearing members interposed between the carrier and the fixed support and adapted to roll in said grooves, and means for preventing lateral displacement of the shaft.

2. A bearing for shafts comprising a movable carrier with a straight upper surface for engagement with the shaft and a lower surface having a longitudinal groove therein, a fixed support having in its upper surface a groove parallel to the first groove, bearing balls interposed between the carrier and the fixed support and adapted to roll in said grooves, and means located between the bearing balls for determining the relative locations of the balls.

3. A bearing for shafts comprising a movable carrier with a straight upper surface for engagement with the shaft and a lower surface having a longitudinal groove therein, a fixed support having in its upper surface a groove parallel to the first groove, spherical bearing members interposed between the carrier and the fixed support and engaging said grooves, and stop means for limiting the movement of the balls and the movement of the carrier.

4. A bearing for shafts comprising a movable carrier with a straight upper surface and a groove in the lower surface, a fixed support having a parallel groove therein, bearing balls engaging the grooves and adapted to roll longitudinally therein, means for engaging the end of the shaft and preventing displacement of the shaft, and means for the vertical adjustment of said engaging means.

5. A bearing for shafts comprising a movable carrier consisting of parallel rods, a fixed supporting member including parallel rods, bearing balls interposed between the rods of the carrier and the rods of the supporting member and means for preventing lateral displacement of the shaft.

6. A bearing for shafts comprising a movable carrier consisting of parallel rods, a stationary supporting member, parallel rods on the said member, bearing balls interposed between the rods of the carrier and the rods on the supporting member, and a slotted member interposed between the carrier and the supporting member for determining the relative locations of the balls.

7. A bearing for shafts comprising a movable carrier consisting of parallel rods, a stationary supporting member, parallel rods on the said member, bearing balls interposed between the rods of the carrier and the rods on the supporting member, and a slotted member located between the carrier and the supporting member for limiting the movement of the bearing balls and the movement of the carrier.

In testimony whereof I have affixed my signature in presence of two witnesses.

CARL GUSTAF von POST.

Witnesses:
GERHARD AHLSTRAND,
ALBIN JISON UBBE.